Sept. 8, 1931.  A. O. HOEFTMANN  1,822,624
CABLE SHIELD
Filed March 7, 1929
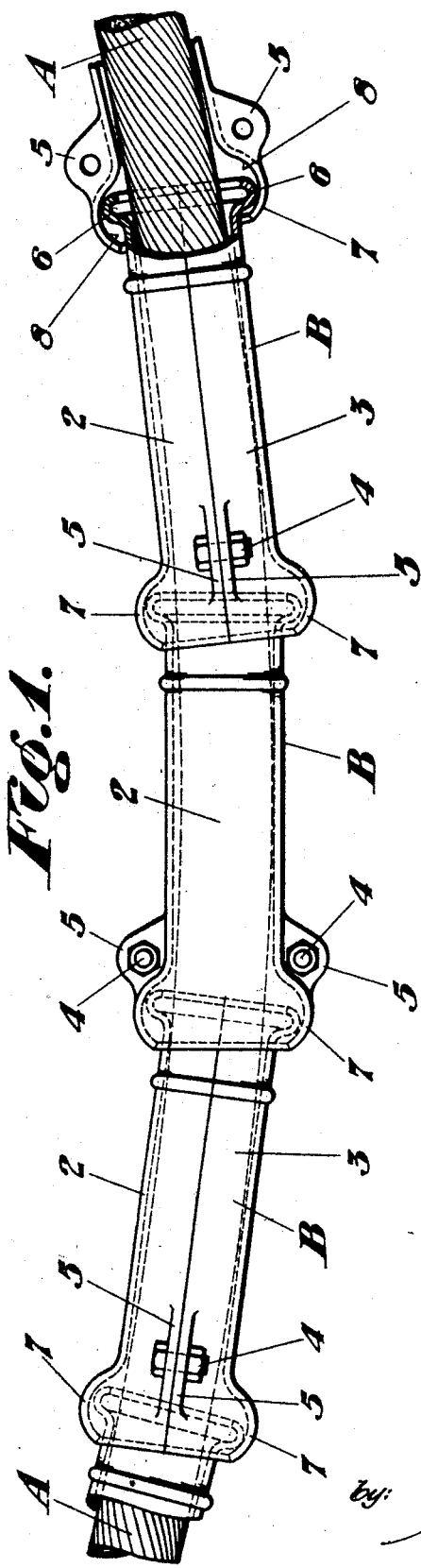
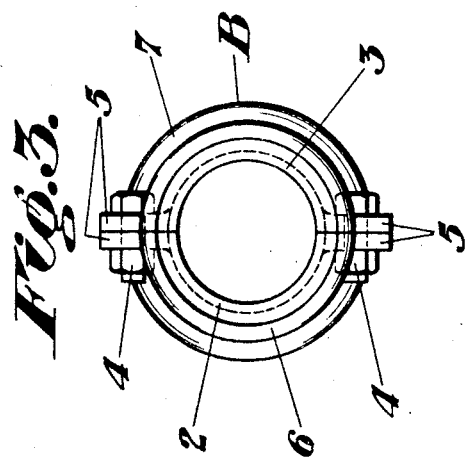
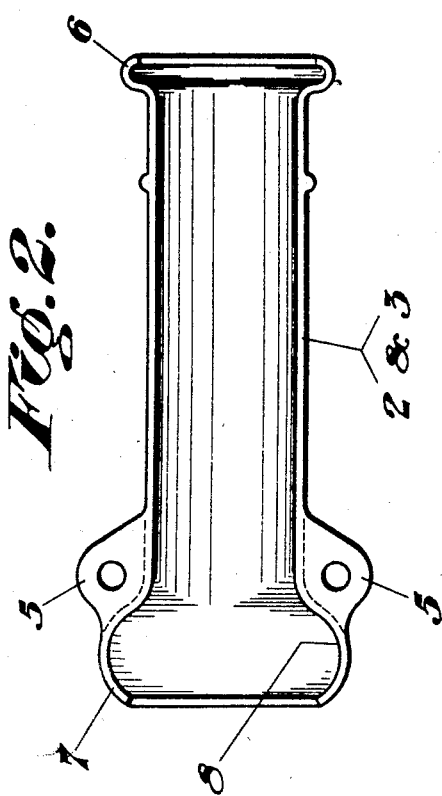
Inventor:
ALEXANDER O. HOEFTMANN,
by: Usina & Rauber
his Attorneys.

Patented Sept. 8, 1931

1,822,624

UNITED STATES PATENT OFFICE

ALEXANDER O. HOEFTMANN, OF WORCESTER, MASSACHUSETTS

CABLE SHIELD

Application filed March 7, 1929. Serial No. 345,145.

This invention relates to cable shields, and more particularly to submarine cable armor shields adapted to protect the cable from damage and wear occasioned by rubbing on rocks, contacting with ships, anchors or other objects, and has for its object to provide a practical flexible armor shield of this class which can be readily applied to the cable at any point along its length.

In the drawings:

Figure 1 is an elevation of a length of cable having the armor shield of this invention applied thereto.

Figure 2 is a plan of one of the shield segments looking at the inside thereof.

Figure 3 is an end elevation of one of the complete or assembled shield members.

Referring more particularly to the drawings, the letter A designates the cable which may be of any standard construction. The letter B designates the armor shield members which are flexibly connected together and any number of which may be connected in a series to protect any length of cable desired.

The armor shield members B are divided longitudinally into sections 2 and 3, which are adapted to be fitted around the cable and secured together by bolts 4 which pass through apertured lugs 5.

The members B are provided at one end with a convex flange 6 and at the other end with a relatively larger flange 7 internally grooved, as at 8, to form a socket. The socket flange 7 of each of the members B is adapted to be mounted over the flange 6 of the next adjacent member B when the sections 2 and 3 are assembled, thereby forming a flexible universal joint connection between each of the several members B in any one series of members.

This novel armor shield may be used not only to protect a submarine cable but, since they are preferably made of relatively heavy cast or forged metal, they may be also used to increase the weight of the cable to prevent its lifting from the bottom.

While I have shown and described one specific embodiment of my invention, it will be understood that I do not wish to be limited thereto, since various modifications may be made without departing from the scope thereof, as defined in the appended claims.

I claim:

1. A cable shield comprising a plurality of short length tubular members adapted to be loosely mounted on a cable, said members being divided longitudinally to facilitate their mounting on a cable and connection to each other, means for securing the parts of said members together, and means formed integral with each of said members adapted to cooperate with corresponding means on adjacent members to form universal joints between adjacent members.

2. A cable shield comprising a plurality of short length tubular members adapted to be loosely mounted on a cable, said members being divided longitudinally to facilitate their mounting on a cable and connection to each other, means for securing the parts of said members together, each of said members being provided with flanges at each end, one of said flanges being relatively larger than the other and being internally grooved to form a socket, said members being flexibly interlocked with each other by mounting the socket flange of each section over the relatively smaller flange of the next adjacent section to form a universal joint.

3. A cable shield comprising a plurality of short length tubular members adapted to be loosely mounted on a cable, said members being divided longitudinally to facilitate their mounting on a cable and connection to each other, means for securing the parts of said members together, and each of said members being interlocked to the next adjacent member by a universal joint connection.

4. A cable shield comprising a plurality of short length tubular members adapted to be loosely mounted on a cable, said members being divided longitudinally to facilitate their mounting on a cable and connection to each other, means for securing the parts of said members together, each of said members being provided with integral flanges at each end, one of said flanges being relatively larger than the other and being internally grooved to form a socket, said members being flexibly interlocked with each other by mounting the socket flange of each section over the relatively smaller flange of the next adjacent section to form a universal joint.

In testimony whereof, I have hereunto set my hand.

ALEXANDER O. HOEFTMANN.